(12) United States Patent
Altinova et al.

(10) Patent No.: US 11,110,766 B2
(45) Date of Patent: Sep. 7, 2021

(54) MOTOR VEHICLE WHEEL SUSPENSION

(71) Applicant: Ford Global Technologies, LLC, Dearborn, MI (US)

(72) Inventors: Egemen Altinova, Leverkusen (DE); Marc Alexander Mendel, Haan (DE); Michael Roehrig, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 404 days.

(21) Appl. No.: 15/179,954

(22) Filed: Jun. 10, 2016

(65) Prior Publication Data
US 2016/0361963 A1    Dec. 15, 2016

(30) Foreign Application Priority Data

Jun. 12, 2015   (DE) .......................... 102015210747.7

(51) Int. Cl.
| | |
|---|---|
| *B60G 11/52* | (2006.01) |
| *B60G 15/06* | (2006.01) |
| *F16F 3/00* | (2006.01) |
| *F16F 9/54* | (2006.01) |
| *B60G 11/00* | (2006.01) |

(52) U.S. Cl.
CPC ............ *B60G 11/52* (2013.01); *B60G 15/068* (2013.01); *F16F 3/00* (2013.01); *F16F 9/54* (2013.01); *B60G 2202/143* (2013.01); *B60G 2800/162* (2013.01)

(58) Field of Classification Search
CPC .......... F16F 13/00; F16F 2228/06; F16F 3/00; F16F 9/54; B60G 11/52; B60G 15/068; B60G 2202/143; B60G 2800/162
See application file for complete search history.

(56) References Cited

U.S. PATENT DOCUMENTS

| | | | | | |
|---|---|---|---|---|---|
| 3,022,991 | A | * | 2/1962 | Billard ................. | B60G 11/125 267/271 |
| 6,364,296 | B1 | * | 4/2002 | Cummings ............. | F16F 1/371 267/141 |
| 2002/0135111 | A1 | * | 9/2002 | Bishop ................. | B60G 13/003 267/64.23 |
| 2007/0209836 | A1 | * | 9/2007 | Kaifie ..................... | F16F 1/387 174/659 |

(Continued)

FOREIGN PATENT DOCUMENTS

| | | |
|---|---|---|
| DE | 102011081696 A1 | 3/2012 |
| DE | 102009025462 A1 | 11/2013 |

(Continued)

*Primary Examiner* — Melody M Burch
(74) *Attorney, Agent, or Firm* — Raymond L. Coppiellie; Burgess Law Office, PLLC

(57) ABSTRACT

A wheel suspension for a motor vehicle wheel for damping NVH effects, wherein the NVH effects are transmitted from an automatic transmission to the driven wheel via the drive train at idle. The NVH effects can potentially be transmitted from the wheel to the vehicle structure via the wheel suspension. The wheel suspension having at least one elastic element, the stiffness of which in a vertical direction of deflection has a softer stiffness characteristic in a deflection range close to the zero point than in deflection ranges more remote from the zero point.

14 Claims, 3 Drawing Sheets

(56) References Cited

U.S. PATENT DOCUMENTS

| | | | | |
|---|---|---|---|---|
| 2010/0327501 A1* | 12/2010 | Neureder | ............. | B60G 13/003 |
| | | | | 267/141 |
| 2011/0216909 A1* | 9/2011 | Sapiejewski | ......... | H04R 1/1008 |
| | | | | 381/71.6 |
| 2012/0049428 A1* | 3/2012 | Moore | ................. | B60G 15/068 |
| | | | | 267/220 |
| 2015/0158362 A1* | 6/2015 | Palka | ..................... | B60G 15/06 |
| | | | | 267/30 |

FOREIGN PATENT DOCUMENTS

| | | | | |
|---|---|---|---|---|
| EP | 2270356 A1 | 1/2011 | | |
| WO | WO-2013029244 A1 * | 3/2013 | ................ | F16F 3/12 |

* cited by examiner

//MOTOR VEHICLE WHEEL SUSPENSION

CROSS-REFERENCE TO RELATED APPLICATIONS

Not Applicable.

BACKGROUND OF THE INVENTION

1. Field of the Invention

The present invention relates to a wheel suspension for a motor vehicle wheel, and more specifically to a suspension damping NVH effects transmitted from a vehicle drive train through a driven wheel to the vehicle structure via the wheel suspension.

2. Description of Related Art

Vehicles with an automatic transmission—which are increasingly being used, even in the mid-range and small car segments—typically exert static torques on the drive shaft at idle, both in forward and reverse gears, these being caused by creep torques of torque converters or of wet clutches. Because play in the drive shaft is used up by these static torques, drive train vibrations can be transmitted unhindered to the wheels via the drive shaft and, from there, can be transmitted to the vehicle structure, in particular to the seats and the steering wheel leading to perceptible and unwanted NVH effects (NVH=Noise, Vibration, Harshness).

These effects occur especially when the vertical resonance behavior of the wheel suspension coincides approximately to the firing frequency of the engine cylinders.

SUMMARY OF THE INVENTION

A motor vehicle wheel suspension including at least one elastic element having a stiffness in a vertical direction of deflection with a softer stiffness characteristic in a deflection range close to the zero point than in deflection ranges more remote from the zero point. The deflection follows a first stiffness curve with a first zero point stiffness in the deflection range close to the zero point, wherein the stiffness transitions to a second stiffness curve in the deflection ranges remote from the zero point. The stiffness curve corresponding substantially to a stiffness curve with a higher zero point stiffness.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
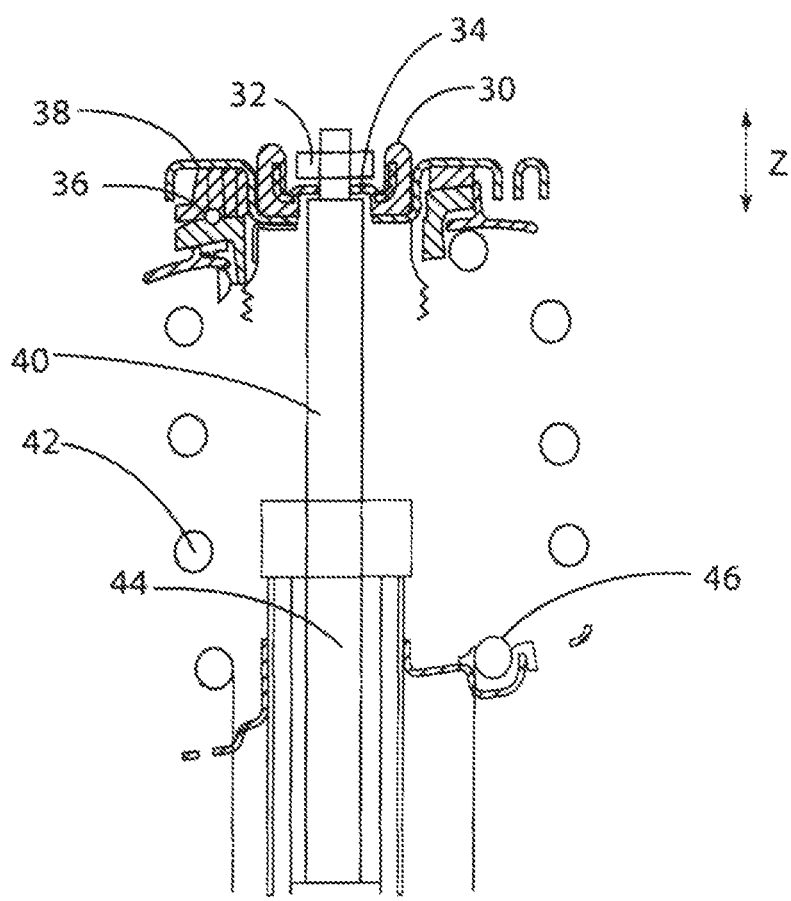
FIG. 1 shows a schematic section through a McPherson spring strut having a supporting mount with a conventional elastic element.

FIG. 1 shows the upper region of a conventional McPherson spring strut of a front wheel suspension on a motor vehicle with front-wheel-drive. The spring 42, which rests on a spring plate 46, surrounds a hydraulic shock damper 44 with a piston rod 40 in a known manner. The wheel, situated underneath, with drive shafts is not shown. A nut 32 secures the piston rod 40 is on a supporting mount, which is supported in a ball bearing 36 to be able to follow the steering movement of the front wheels. The piston rod 40 forms an inner force path, while the spring 42 forms an outer force path. The supporting mount is of resilient design in the prior art shown, but has only a single stiffness characteristic. For this purpose, the supporting mount has an elastic rubber element 30, held by a surrounding metal plate 38, as best seen in FIG. 1. A metal ring 34 having a collar that extends upward and forms a counterbearing for the nut 32 is vulcanized into this elastic rubber element 30.

When the internal combustion engine is idling, engine vibrations are transmitted to the driven wheels and hence to the suspension thereof by an automatic transmission (not shown). For these relatively high frequencies with low amplitudes, the shock damper 44 may be regarded as almost rigid, owing to the existing static friction forces, with the result that these vibrations are ultimately applied to the supporting mount.

However, such vibrations can be largely absorbed in the supporting mount through a suitable variable elasticity characteristic, as explained below with reference to the curves in FIG. 2.

According to the present example, the wheel suspension may include at least one elastic element, the stiffness of which in a vertical direction of deflection has a softer stiffness characteristic in a deflection range close to the zero point than in deflection ranges more remote from the zero point. Wherein the deflection follows a first stiffness curve with a first zero point stiffness in the deflection range close to the zero point and wherein the stiffness in each case transitions to a second stiffness curve in the deflection ranges remote from the zero point. The stiffness curve corresponding substantially to a stiffness curve with a higher zero point stiffness.

The term "stiffness" means the restoring force of the at least one elastic element relative to the deflection from the zero or rest position. This variable is also known as the spring constant, i.e., a linearity factor between force and deflection. In contrast to the linearity range of a traditional coil spring, the spring constant of the elastic elements of interest here (e.g. toroidally shaped rubber elements) is generally not constant but increases monotonically with increasing deflection. As a rough approximation, typical stiffness curves for elastic elements have a parabolic profile and are approximately symmetrical regarding deflections in both directions, wherein the stiffness in the case of zero deflection has a particular value, which is referred to below as the zero point stiffness.

Figure 2:
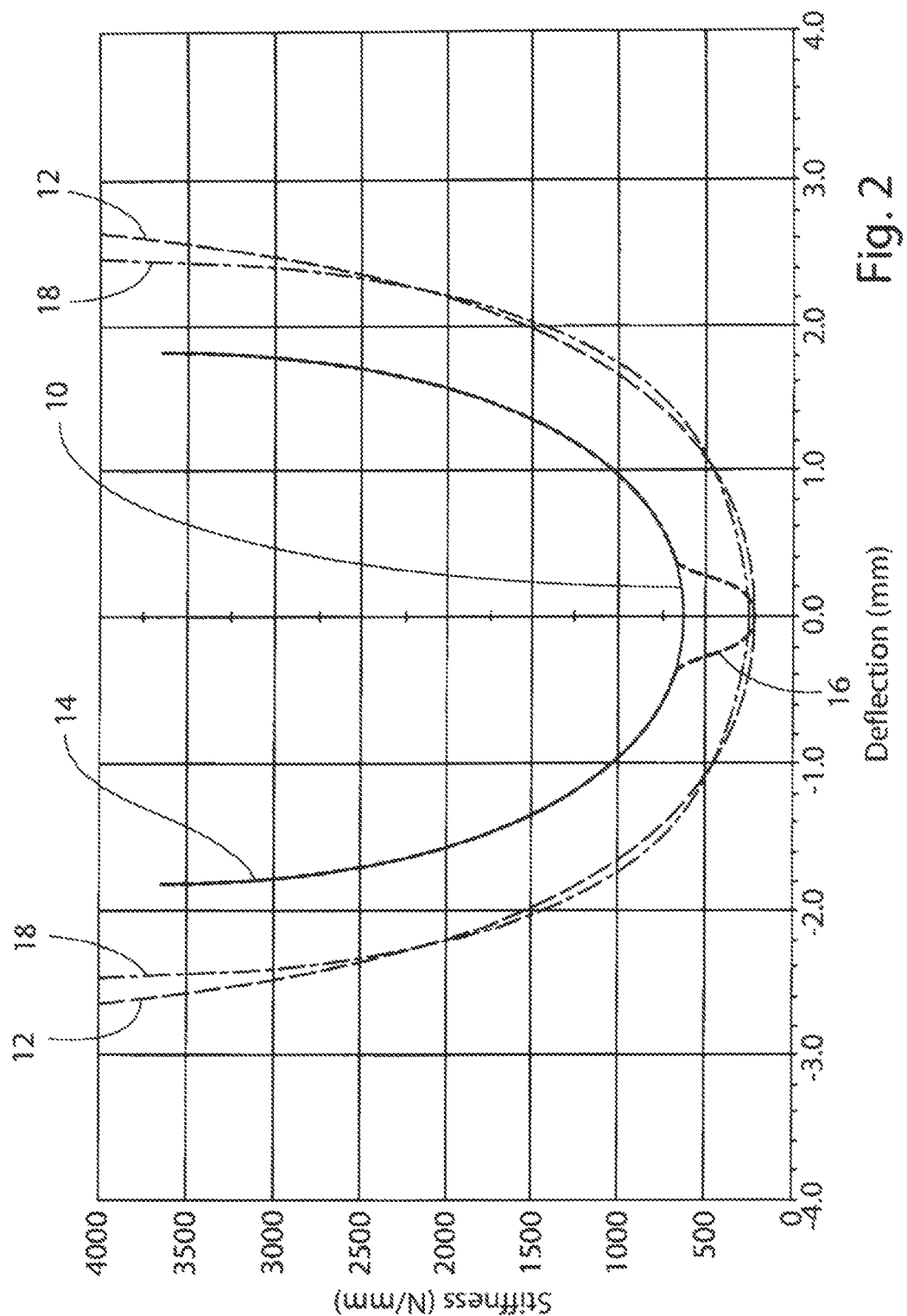
FIG. 2 shows a schematic diagram containing various stiffness curves illustration on example of the present invention.

FIG. 2 illustrates various stiffness curves using the unit N/mm as a function of the deflection from the zero or rest position of an elastic supporting mount (deflection in mm) for a suspension of a motor vehicle wheel, wherein the deflection takes place in the vertical direction or z direction (in this respect, see the direction of the arrow in FIG. 1) or the axial direction. A conventional elastic element, of the type illustrated in FIG. 1, for a supporting mount is represented by the curve 10 indicated by a thin line (which coincides with the dashed curve 14 in the outer regions). This curve has a relatively high zero point stiffness of about 600 N/mm, this being advantageous in terms of ride dynamics.

However, with such a low elasticity according to curve 10, engine vibrations, which can be transmitted to the drive train, the drive shafts and the wheels via an automatic transmission at idle, are poorly damped and can propagate via the wheel suspension to the steering and the vehicle body and can lead to increased NVH effects.

With a softer elasticity behavior in the vertical direction, in contrast, as illustrated with illustrative curves 12 and 18, significant damping of the NVH effects can be achieved. The two curves 12 and 18—which stem from comparable test structures—are distinguished by a lower zero point stiffness of about 250 N/mm, i.e. of less than half the zero point stiffness of curve 10. However, such a low stiffness over the entire range of deflection would be disadvantageous in terms of ride dynamics.

In the present example, the elastic element is configured such that both curves 10, on the one hand, and 12 or 18, on the other hand, are combined to form a curve 14 (dashed line). The curve 14 (dashed line), approximately follows the "softer" curves 12 and 18 in a deflection range close to the zero point, up to about 0.15 mm (in both directions). The curve 14 (dashed line) then transitions to the stiffer "conventional" curve 10 in transitional ranges, which extend approximately from 0.15 to 0.35 mm deflection in both directions, giving a downward bulging protrusion 16 in curve 14 overall.

The advantages of the two curves, on the one hand the more favorable NVH characteristic of the softer curve 12 or 18 and the better ride dynamics of the stiffer curve 10, are combined. In the central regions close to the zero point, the combined curve 14 follows the softer curve 12 or 18, whereas the outer regions remote from the zero point follow the stiffer curve 10. If only the outer regions of the curve 14 were considered and the curve were interpolated between them, e.g. by means of a parabola, the y-axis (zero deflection) would be intersected at a higher zero point stiffness than the softer curve 12 or 18 (approximately at the value at which the actual curve 10 also intersects the y-axis).

The lower stiffness in the relatively narrow deflection range close to the zero point is of secondary importance to the ride dynamics.

Figure 3:
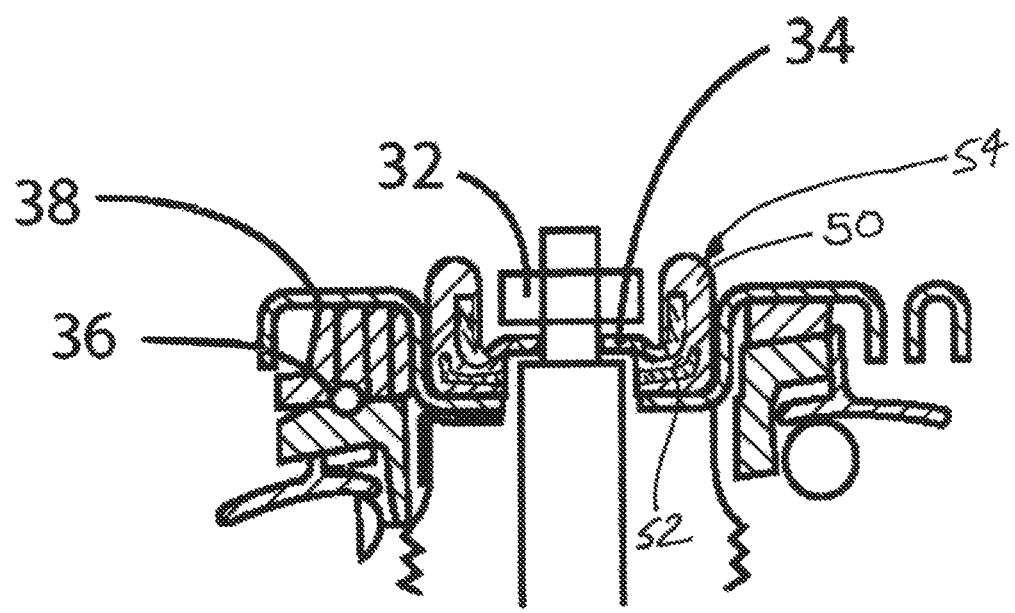
FIG. 3 shows a schematic section of a wheel suspension, illustrating one example of the present invention.

FIG. 3 illustrates one example wherein the transition between the two curves can be achieved by the elastic element 54 having a first, soft elastic component element 52, which is supported in a harder, second elastic component element 50, wherein the deflection of the first component element 52 relative to the second component element 50 is limited, so only the second component element 50 is deflected further in the case of deflections remote from the zero point.

The disclosed example combines two different stiffness characteristics, namely a softer stiffness characteristic with a lower zero point stiffness in the case of small deflections. With larger deflections, the curve transitions to a second stiffness curve, the theoretical zero point stiffness of which is higher. The term "theoretical" zero point stiffness is used because this second curve takes effect only outside the zero point.

In a transitional range between the two curves, the stiffness corresponds neither to one curve nor to the other, the curve at that point forming a link between the two.

In the deflection range close to the zero point, the at least one elastic element preferably has a stiffness such that vibrations transmitted to the wheel by the drive train at idle are at least partially resonance-absorbed by the at least one elastic element, so the drive train vibrations cannot propagate to the vehicle body or are greatly damped and are no longer perceived as troublesome.

In the disclosed example, the transition between deflection ranges close to the zero point and those remote from the zero point is localized at a zero point deflection in both directions of deflection in a range of from 0.1 to 0.2 mm, i.e. at relatively small deflections which account for a maximum of about 8% of the deflection range in the case of a usable deflection range of, for example, about 2.5 mm.

In disclosed example, it is possible for the first stiffness curve to comprise stiffnesses of no more than 400 N/mm, preferably of no more than 250 to 300 N/mm, based on a zero point deflection of 0.75 mm in both directions. The exact configuration depends on the specific resonant frequencies to be damped.

The second stiffness curve can furthermore have a zero point stiffness of about 600 to 1000 N/mm, preferably of about 700 to 900 N/mm.

The radial stiffness of the elastic element—i.e. the stiffness in the horizontal direction or x or y direction—in the deflection range close to the zero point is at least 8.0, particularly preferably 10.0 to 15.0, times as great as the vertical stiffness—or stiffness in the z direction or axial stiffness—in the deflection range close to the zero point. There is a greater difference between the stiffnesses in the radial and vertical directions than is customary with elastic elements in the region of the vehicle suspension in the prior art.

In particular, the radial stiffness in the deflection range close to the zero point can be in the range of from 3000 to 5000 N/mm, particularly preferably about 3200 to 4500 N/mm.

In one example of the invention, the elastic element can be provided in the region of the supporting mount of the shock damper in the inner force path of a McPherson spring strut.

Here, the elastic element can have a first, soft elastic component element, which is supported in a harder, second elastic component element, wherein the de-flection of the first component element relative to the second component element is limited, so only the second component element is deflected further in the case of deflections remote from the zero point.

In the illustrative example, the radial stiffness of the supporting mount especially in the x and y directions, remains approximately the same as that known in the prior art, at about 2000 to 3600 N/mm, this being advantageous in terms of ride dynamics. Given a minimum value of, typically, about 250 N/mm, the vertical stiffness differs more from the radial stiffness than is known in the prior art since the vertical stiffness in the prior art is between 700 and 900 N/mm in the rest position. In the invention, the maximum ratio of vertical to radial stiffness is about 10.0 to 15.0, in contrast to the prior art, with a ratio of about 5.0 to 6.0.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle wheel suspension comprising:
an elastic element, the stiffness of which in a vertical direction of deflection has a softer stiffness characteristic in a deflection range close to a zero point than in deflection ranges more remote from the zero point, wherein the deflection follows a first stiffness curve with a first zero point stiffness in the deflection range close to the zero point, and wherein the stiffness transitions to a second stiffness curve in the deflection ranges remote from the zero point, said second stiffness curve corresponding substantially to a stiffness curve with a higher zero point stiffness; and
wherein the first stiffness curve has a stiffness of no more than 400 N/mm based on a zero point deflection of 0.75 mm in both directions.

2. The wheel suspension of claim 1 wherein in the deflection range close to the zero point, the elastic element has a stiffness such that vibrations transmitted to the wheel by a drive train at idle are at least partially resonance-absorbed by the elastic element.

3. The wheel suspension of claim 1 wherein the second stiffness curve has a zero point stiffness of about 600 to 1000 N/mm.

4. The wheel suspension of claim 1 wherein a radial stiffness of the elastic element in the deflection range close to the zero point is at least 8.0 times as great as the vertical stiffness in the deflection range close to the zero point.

5. The wheel suspension of claim 4 wherein the radial stiffness in the deflection range close to the zero point is in the range of from 3000 to 5000 N/mm.

6. The wheel suspension of claim 1 wherein the elastic element is provided in the region of the supporting mount of the shock damper in the inner path of a McPherson spring strut.

7. A motor vehicle wheel suspension comprising:
an elastic element, the stiffness of which in a vertical direction of deflection has a softer stiffness characteristic in a deflection range close to a zero point than in deflection ranges more remote from the zero point, wherein the deflection follows a first stiffness curve with a first zero point stiffness in the deflection range close to the zero point, and wherein the stiffness transitions to a second stiffness curve in the deflection ranges remote from the zero point, said second stiffness curve corresponding substantially to a stiffness curve with a higher zero point stiffness; and
wherein the transition between deflection ranges close to the zero point and those remote from the zero point is localized at a zero point deflection in both directions of deflection in a range of from 0.1 to 0.2 mm.

8. A motor vehicle wheel suspension comprising:
an elastic element, the stiffness of which in a vertical direction of deflection has a softer stiffness characteristic in a deflection range close to a zero point than in deflection ranges more remote from the zero point, wherein the deflection follows a first stiffness curve having a parabolic profile with a first zero point stiffness in the deflection range close to the zero point, and a second stiffness curve having a parabolic profile, wherein the stiffness transitions to the second stiffness curve in the deflection ranges remote from the zero point, said second stiffness curve corresponding substantially to a stiffness curve with a higher zero point stiffness;
the elastic element including a first elastic component and a second elastic component;
the second elastic component harder than said first elastic component and supporting said first elastic component, wherein the deflection of the first elastic component relative to the second elastic component is limited, so only the second elastic component is deflected further in the case of deflections remote from a zero point; and
wherein the first elastic component has a stiffness curve having a stiffness of no more than 400 N/mm based on a zero point deflection of 0.75 mm in both directions.

9. The wheel suspension of claim 8 wherein the second elastic component has a second stiffness curve having a zero point stiffness of about 600 to 1000 N/mm.

10. A motor vehicle wheel suspension comprising:
an elastic element, the stiffness of which in a vertical direction of deflection has a softer stiffness characteristic in a deflection range close to a zero point than in deflection ranges more remote from the zero point, wherein the deflection follows a first stiffness curve having a parabolic profile with a first zero point stiffness in the deflection range close to the zero point, and a second stiffness curve having a parabolic profile, wherein the stiffness transitions to the second stiffness curve in the deflection ranges remote from the zero point, said second stiffness curve corresponding substantially to a stiffness curve with a higher zero point stiffness;
the elastic element including a first elastic component and a second elastic component;
the second elastic component harder than said first elastic component and supporting said first elastic component, wherein the deflection of the first elastic component relative to the second elastic component is limited, so only the second elastic component is deflected further in the case of deflections remote from a zero point;
wherein the first elastic component has a stiffness curve having a zero point stiffness of no more than 250 to 300 N/mm based on a zero point deflection of 0.75 mm in both directions; and the second elastic component has a stiffness curve having a zero point stiffness of about 600 to 1000 N/mm.

11. The wheel suspension of claim 10 wherein the combined radial stiffness of the first elastic component and the second elastic component in the deflection range close to the zero point is at least 8.0 times as great as the vertical stiffness in the deflection range close to the zero point.

12. The wheel suspension of claim 11 wherein the combined radial stiffness of the first elastic component and the second elastic component in the deflection range close to the zero point is between 10.0 to 15.0 times as great as the vertical stiffness in the deflection range close to the zero point.

13. A motor vehicle wheel suspension comprising:
an elastic element having a stiffness in a direction of deflection, the elastic element following a first stiffness curve having a parabolic profile and a first stiffness curve zero point stiffness at a zero point of deflection and a second stiffness curve having a parabolic profile and a second stiffness curve zero point at the zero point of deflection, with the second stiffness curve zero point greater than the first stiffness curve zero point;
wherein the stiffness of the elastic element in the direction of deflection follows the first stiffness curve in a deflection range up to 0.15 mm in both directions, transitions to the second stiffness curve in a transitional deflection range extending between 0.15 mm and 0.35 mm in both directions, and follows the second stiffness curve in a deflection range greater than 0.35 mm in both directions.

14. The wheel suspension of claim 13 wherein the first stiffness curve zero point stiffness is no more than 400 N/mm in a deflection range from 0 to 0.75 mm in both directions and the second stiffness curve zero point stiffness is between 600 to 1000 N/mm.

* * * * *